United States Patent [19]

Cummings

[11] 4,197,044

[45] Apr. 8, 1980

[54] CHUCK ASSEMBLY AND COLLET

[75] Inventor: Willard Cummings, Pembroke, N.C.

[73] Assignee: The Bendix Corporation, Southfield, Mich.

[21] Appl. No.: 2,117

[22] Filed: Jan. 9, 1979

[51] Int. Cl.² .......................... B23C 5/26; B23B 31/04
[52] U.S. Cl. ...................................... 409/232; 279/52; 279/59; 279/82; 408/239 A; 409/234
[58] Field of Search ....................... 279/46, 51, 52, 58, 279/59, 76, 82; 90/11 A; 409/231, 232, 234, 241; 408/239, 239 A

[56] References Cited

U.S. PATENT DOCUMENTS

| | | | |
|---|---|---|---|
| 3,195,909 | 7/1965 | Dinnen | 279/51 |
| 3,425,705 | 2/1969 | Benjamin et al. | 279/56 |
| 3,556,540 | 1/1971 | Benjamin et al. | 279/76 X |
| 3,618,962 | 11/1971 | Cox et al. | 409/232 X |
| 3,830,135 | 8/1974 | Sullivan | 409/234 |

*Primary Examiner*—Z. R. Bilinsky
*Attorney, Agent, or Firm*—Kenneth A. Seaman; Raymond J. Eifler

[57] ABSTRACT

A chuck assembly and collet for retaining an end mill tool against axial pullout. The collet includes a radially compressible body having a tapered outer surface, a central bore and a radial aperture extending from the outer surface into the central bore. The radial aperture, which includes larger and smaller diameter portions, has a movable pin mounted therein and adapted to extend into the bore to retain the tool. The pin has an undercut portion, with a spring or snap ring mounted around the pin in the undercut portion, said spring having a free diameter slightly larger than the larger diameter to provide a pressure fit when mounted therein. The undercut has a length which is larger than the thickness of the snap ring to allow a limited radial movement of the pin to lock and to release the tool, whereby the pin is urged inwardly into the bore and engages a rear bevel end on a flat surface on the tool to secure the tool within the collet as the collet is tightened within the chuck assembly and whereby the pin can move outwardly to release the tool when the collet is removed from the chuck assembly.

6 Claims, 4 Drawing Figures

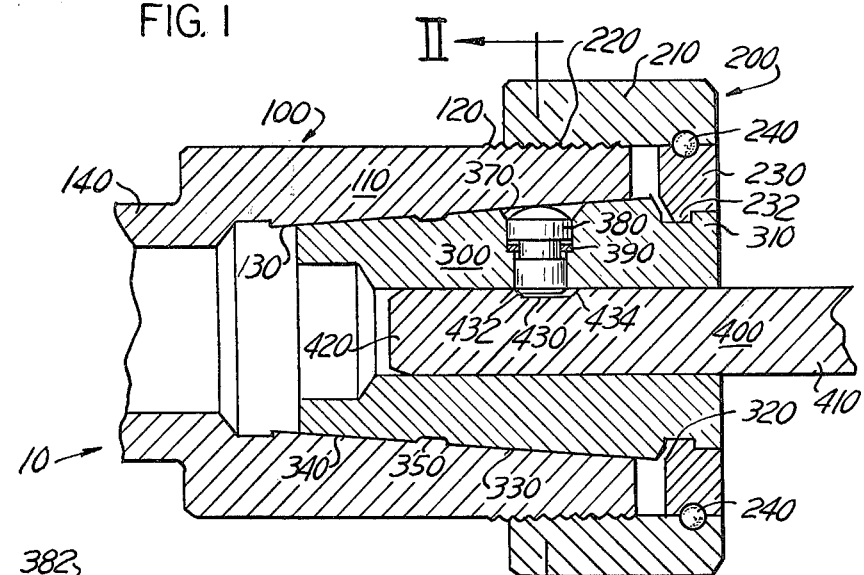
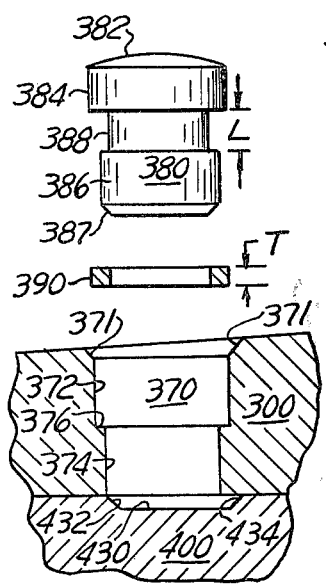
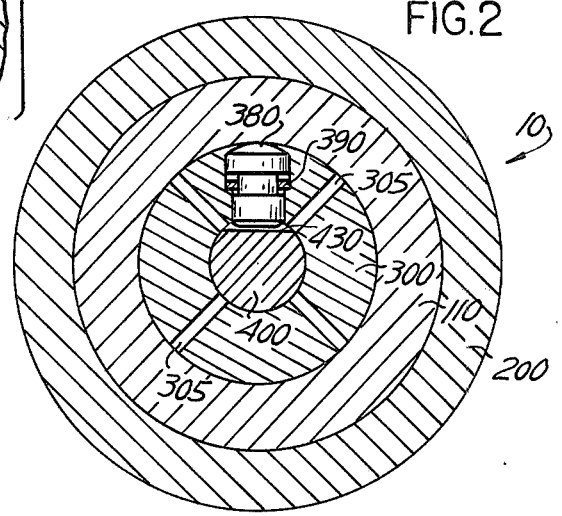
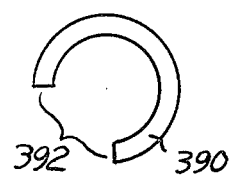

CHUCK ASSEMBLY AND COLLET

CROSS REFERENCE TO RELATED PATENTS

The present invention is related to a concurrently filed patent application entitled, "Slotted Collet and Method of Making", the specification and drawings which are hereby specifically incorporated by reference. This patent will hereafter be referred to as the "Slotted Collet Patent".

FIELD OF THE INVENTION

The present invention relates generally to a holding apparatus for cutting tools. More particularly, the present invention relates to a collet and chuck assembly for holding an end mill (or similar) tool to prevent axial or rotational movement with respect to the apparatus during machining.

An end mill tool is a cylindrical cutting tool which has cutting (or milling) edges around the round portion at one or more of its ends along with cutting teeth on its end toward at least one of its forward ends. The tool has a generally cylindrical rear or central shank with at least one beveled-ended flat surface which is secured in the collet and chuck assembly during machining.

BACKGROUND ART

Various designs have been suggested for providing a collet and chuck assembly for securing an end mill tool therein against axial movement of the tool out of the assembly and against rotation of the tool with respect to the assembly and collet.

Such designs generally include an aperture through the collet, with a movable pin mounted therein for engaging a flat surface on the end mill shank. Mounting and retaining the pin suitably has been a problem in the prior art collets. The pin should be easily movable to secure and release the tool, while resisting accidental separation of the pin from the collet. However, for service or repair, the pin should be quickly and easily released. Further, the mounting and retaining mechanism should not be on the external surface of the collet, to minimize the chance of damage thereto.

One approach suggested in the prior art was to provide the outer collet body and pin with a groove, in which an external spring retaining ring is mounted.

Another prior art approach was to drill a hole through the collet body perpendicular to and intersecting the pin aperture. The movable pin is provided with a hole also, and a roll pin is inserted into the aligned pin hole and collet body hole to retain the movable pin.

Typically, such designs have at least one of the following disadvantages: expensive to manufacture; time-consuming, difficult and/or expensive to assemble; parts, other than the collet body and the pin itself, which are on the external surface of the collet and subject to wear and destruction.

Examples of such collets are shown in U.S. Pat. Nos. 3,195,909; 3,425,705; 3,618,962; and others.

It is thus apparent that there are advantages and limitations of the prior art collets for retaining an end mill tool. Lacking is a collet which is reliable and economical to manufacture, while quickly engaging and disengaging an end mill-type tool without external parts to be damaged. Other disadvantages and limitations of the prior art collets and chuck assemblies will be apparent from the following description of the present invention.

SUMMARY OF THE INVENTION

The present invention is a chuck assembly and collet which overcomes the limitations and disadvantages of the prior art collets previously described.

The present invention is a chuck assembly and collect which provides a convenient means for securing an end mill or similar tool when desired and for quickly and easily releasing it. The collet is relatively inexpensive to manufacture and assemble, easily and quickly assembled and has a minimum of external parts. The collet also has a high reliability and resistance to damage and to accidental separation of parts which could lead to a loss of parts.

The chuck assembly includes a collect having a pin mounted in a two-diameter radial aperture extending through the collet. The pin has a small undercut portion intermediate its end portions with a snap ring (or spring) mounted in the undercut. The snap ring, which has a free or no-force diameter slightly larger than the larger diameter aperture portion, is assembled around the pin in the undercut portion, then forced into the larger diameter portion of the aperture. The snap ring provides a radial force, creating a friction with the aperture restricting removal of the pin. The undercut length on the pin is larger than the thickness of the snap ring to allow a limited movement of the pin, while preventing the pin from becoming accidentally separated from the collet.

The foregoing and other objects and advantages of the present invention will become apparent to one skilled in the art in view of the following description and claims and the accompanying drawings.

BRIEF DESCRIPTION OF THE DRAWINGS

FIG. 1 is a cross-sectional view of chuck assembly and collet of the present invention.

FIG. 2 is a cross-sectional view of the chuck assembly and collet of FIG. 1, taken along the line II—II looking in the direction of the arrows.

FIG. 3 is an enlarged view of a pin, snap ring and collet portion prior to assembly.

FIG. 4 is a view of the snap ring preferred in the present invention.

DETAILED DESCRIPTION OF THE DRAWINGS

FIG. 1 shows a cross-sectional view of a part of a chuck assembly 10 of the present invention. The chuck assembly 10 includes a chuck or collect holder 100 and a lock nut 200. A collet 300 is mounted within the tool holder 100 and has an end mill tool 400 mounted therein.

The collet holder 100 is of a well-known and conventional design and includes a body 110 with external forward screw threads 120 and an internal, inwardly tapering bore 130 extending rearwardly from the forward end of the body. A rear portion 140 is a shank which is configured to be secured in a machine tool or spindle.

The lock nut 200 is also a conventional design and may be of the type shown in U.S. Pat. No. 3,618,962 to Cox, et al for "Collet Chuck", incorporated herein by reference. The lock nut 200 includes a body 210 with internal threads 220 adapted to mate with the external threads 120 on the collet holder 100. A second member 230 of thelock nut 200 is coupled to the body 210 with ball bearings 240 and the member 230 has a projection 232, the purpose of which will be explained later.

The collet 300 is preferably mde of an appropriate spring-type steel which has been hardened and drawn, as is well-known and customary in making collets. The collet has a body with an internal tool-receiving bore and with an outside external surface which tapers generally to a smaller rear diameter.

The external surface of collet 300 has a forward portion 310, an annular groove 320, a tapering forward portion 330 and a tapering rear portion 340. The forward portion 330 and the rear portion 340 are separated by an annular groove 350. At least portions of both the forward portion 330 and the rear portion 340 of the collet seat against and engage internal walls of the tapered holder bore 130 when the collet 300 is fully inserted. Such an engagement of two spatially-separated surfaces 330, 340 with the bore 130 allows good engagement of the collet 300 within the collet holder 100.

The lock nut projection 232 cooperates with the forward collet portion 310 and the annular groove 320 to release the collet 300 from the collet holder bore 130 as the lock nut 200 is unscrewed in disassembly.

A radial aperture 370 extends through the collet 300 medially along the length of the collet. The aperture includes a larger diameter portion and a smaller diameter portion. A tool-securing pin 380 is positioned within the aperture 370 and is held in place by a snap ring or spring member 390.

The pin 380 has structure which is described in detail in connection with FIG. 3. The pin 380 is radially movable through a limited range of radial movement when assembled, as also will be discussed later.

The snap ring 390 is made from a carbon spring steel, preferably a "square section ring" of the type sold by Loeffler Spring Company and has a free, or uncompressed, diameter which is slightly (approximately 0.001–0.005 inches) larger than the larger diameter portion of the aperture. The spring must be compressed from its free, or no-force, diameter to be inserted into the aperture, and once inserted, provides an outward or radial force against the wall of the aperture to retard its movement with respect thereto.

The collet 300 is provided with a plurality of axially extending slots through the wall thereof. The slots could be formed in any of several known methods and configurations, for instance, the preferred embodiment as shown in the referenced Slotted Collet Patent previously identified. The slots in the collet and spring-characteristics of the steel allow a radial compression of the collet to tightly engage the tool 400 after the tool 400 is inserted, while allowing clearance for easy insertion of the tool 400 during insertion.

The tool 400 is a conventional tool (such as an end mill) which has forward cutting surfaces 410 and rear shank 420. The foward cutting surfaces 410 have side surfaces, as well as end surfaces, for cutting and the cutting on the side surfaces may tend to pull the tool out of the holder (unlike a drill, where the forces on the end tend to push the tool in). Therefore the shank 420 of an end mill tool has one or more flat surfaces with forward and rear beveled ends 432, 434 for tool retention. The beveled ends 432, 434 have a 45° angle with respect to the axis of the tool. The beveled flat surface, when suitably engaged within the collet, prevents the tool from being pulled out of the holder.

FIG. 2 shows a cross-sectional view of the assembly 10 taken along the line II—II in FIG. 1. The lock nut 200 is mounted concentrically around the body 110. Features of the collet 300 are shown: slots 305, the tool-securing pin 380, and the snap ring 390. The tool 400 and the flat surface 430 are also apparent in this view.

When the collet 300 is full inserted and held within the collet holder 100, a centering of the tool 400 and an elimination of clearance between the tool 400 and the collet 300 are accomplished. The clearance is necessary for the insertion of the tool into and the removal of the tool out of the collet, but is provided only when the collet 300 is free of the holder 100.

FIG. 3 shows the pin 380, the snap ring 390 and the aperture 370 portion of the collet 300 and tool 400 in an enlarged cross-sectional view. The radial aperture 370 in the collet 300 receives the pin 380 and snap ring 390 when assembled.

The aperture 370 has a chamfer, or a tapered outer entrance, 371, a larger diameter portion 372 and a smaller diameter portion 374, which portions 372, 374 meet at a shoulder 376. The radial aperture 370 could be made by drilling a hole of the smaller diameter through the collet body 300, then provide the larger diameter toward the other surface of the collet with a counterbore. A single pass with a step drill could also be used advantageously. In any event, the chamfer 371 would be provided in a known manner.

As an alternate design and configuration, the collet aperture 370 could be manufactured with an enlarged diameter or undercut in the medial portion. The snap ring 390 would then be assembled into the larger diameter or undercut medial portion.

The pin 380 has a rounded, or radiused, head 382, a larger diameter upper portion 384, a smaller diameter lower portion 386 and an undercut portion 388 located between the portions 384, 386. The undercut portion 388 has a length L.

The snap ring 390 has a thickness T which, for a half inch diameter shank end mill tool, is preferably chosen so that the length L exceeds the thickness T by approximately 0.080 inches, so that the pin 380 can travel 0.080 inches to secure and release the flat surface 430 of the tool 400. The length L should be chosen to exceed the depth of the flat on the tool by the approximately 0.020 to clear the bore by that amount during tool insertion. For large diameter shank tools, the dimensions are suitably larger.

The pin 380 is provided with a chamfer 387 extending around the lower portion 386. The chamfer 387, or beveled surface, has a 45° angle with respect to the axis of the pin 380, which angle complements the angle on the rear beveled end 432 of the tool shank flat surface 430. The chamber 387, in fact, engages the beveled end 432 when the tool 400 is secured in the collet 300, without the necessity of the bottom of the pin 380 engaging the flat 430 itself. Preferably, the bottom of the pin is approximately 0.015 inches above the flat 430 when the tool is secured, as is shown in FIGS. 1 and 2.

The pin 380 is assembled into the collet 300 as follows. The snap ring 390 is inserted around the pin 380 in the region of the undercut 388 and has an inside diameter greater than that of the undercut but less than the other pin portions, so that the snap ring 390 is captivated within the undercut, while allowing the spring to move radially in the undercut. The assembled pin 380 and snap ring 390 are then forced into the aperture 370, which forcing compresses the snap ring to a diameter no larger than the diameter of the larger portion 372 of the aperture. The compression is accomplished by the tapered entry 371. The snap ring 390, when fully inserted, seats on the shoulder 376 and is prevented from moving outward by its radial force against aperture portion 372 and the resulting friction.

When the collet 300 is secured within the bore 130 of the collet holder 100, the head 382 of the pin 380 is depressed radially to cause the chamber 387 to engage the beveled surface 432.

FIG. 4 shows an enlarged view of the snap ring 390. The snap ring 390 is preferably a single turn having substantially two-thirds of one revolution, with a gap 392 between the ends. The gap 392, chosen to be approximately 0.3 inches in the preferred embodiment, allows the snap ring 390 to be inserted by hand (without tools) in the region of the undercut 388.

The foregoing description of the preferred embodiment is merely exemplary of the present invention. The structure shown may be modified in one of several ways known to those skilled in the art, and further, some features of the present invention may be used without the corresponding use of other features. For example, other configurations of snap rings or spring members could be substituted, either with or without changes to the structure of the radial aperture or pin. The pin and aperture could be moved either forward or rearward with respect to the collet body. The pin might be of uniform size on its ends and need not be round. Accordingly, the present description is illustrative of the present invention only and should not be taken as limiting the scope of the invention which is solely by the following claims.

Having thus described the invention, what is claimed is:

1. A collet comprising:
   a radially resilient body having a tapered outer surface and a tool-receiving bore extending axially therethrough, said body having an aperture extending radially from the outer surface into said bore, said aperture including a first position of larger dimension and second portion of smaller dimension;
   a tool-securing pin having a head portion at one end thereof, and a tool-securing surface toward the other end thereof; and
   means for mounting said pin within the aperture while allowing a limited radial movement of the pin within the aperture, said means including:
   an undercut on the pin mediate of the ends thereof, said undercut extending a length in the direction of the ends; and
   a compressible spring member carried upon the pin in the pin undercut having a thickness less than the length of the undercut, said member having a no-force diameter greater than the first aperture portion and being compressible to a diameter no greater than the diameter of the first portion to allow insertion therein and thereafter to provide a frictional force resisting removal of the pin.

2. A collet of the type described in claim 1 wherein said spring member is a snap ring.

3. A collet of the type described in claim 2 wherein said snap ring has a square cross-section.

4. A collet of the type described in claim 2 wherein said snap ring is an open type having a gap between its ends sufficient to allow the snap ring to be inserted over the pin by hand.

5. A collet of the type described in claim 1 wherein the aperture additionally includes a chamfer for compressing the spring member during insertion.

6. A chuck assembly comprising:
   a collet holder having an external thread and an internal bore which tapers rearwardly from a forward face;
   a collet mounted within the bore of said collet holder, said collet including:
   a radially resilient body with a tapered outer surface engaging the bore of said collet holder and a tool-receiving bore extending axially therethrough said body having an aperture extending radially from the outer surface into said bore;
   a tool-securing pin having a head portion at one end thereof, and a tool-securing surface toward the other end thereof;
   means for mounting said pin within the aperture while allowing a limited radial movement of the pin, said means including:
   a shoulder within the aperture;
   an undercut on the pin mediate of the ends thereof, said undercut extending a length in the direction of the ends; and
   a compressible spring member mounted on the aperture shoulder and around the pin undercut, said spring having a diameter greater than that of the pin undercut and less than the pin outside of the undercut and having a thickness less than the length of the undercut, so that said spring allows the pin to move radially along the length of the undercut; and
   means for urging the collet into the collet holder bore to compress the body around the tool, said means including an internal thread adapted to mate with the external thread on the collet.

* * * * *